United States Patent [19]

Wingate

[11] Patent Number: 4,480,312
[45] Date of Patent: Oct. 30, 1984

[54] TEMPERATURE SENSOR/CONTROLLER SYSTEM

[76] Inventor: Steven L. Wingate, 1904 Rustic Road, Johnson City, Tenn. 37601

[21] Appl. No.: 293,019

[22] Filed: Aug. 14, 1981

[51] Int. Cl.$^3$ .................. G06F 15/20; G01K 7/00
[52] U.S. Cl. .................. 364/557; 377/25; 374/170
[58] Field of Search .......... 364/557; 377/25; 374/170-172, 183

[56] References Cited

U.S. PATENT DOCUMENTS

| | | | |
|---|---|---|---|
| 4,031,365 | 6/1977 | Raggiotti et al. | 364/557 |
| 4,122,719 | 10/1978 | Carlson et al. | 374/171 |
| 4,150,573 | 4/1979 | Iinuma et al. | 377/25 |
| 4,211,113 | 7/1980 | Harrison | 364/557 |
| 4,234,927 | 11/1980 | First | 364/557 |
| 4,286,465 | 9/1981 | Thomae | 364/557 |
| 4,296,632 | 10/1981 | Bloomer et al. | 374/171 |
| 4,327,416 | 4/1982 | Jerrim | 364/557 |

Primary Examiner—Gary Chin
Attorney, Agent, or Firm—William E. Hein

[57] ABSTRACT

A highly accurate electronic temperature sensor/controller system employs one or more sensing devices, a precision voltage reference, a pair of analog multiplexers, a voltage-to-frequency converter, a microcomputer, a keyboard, an output display, and one or more solid state switches.

7 Claims, 3 Drawing Figures

TEMPERATURE SENSOR/CONTROLLER SYSTEM

BACKGROUND AND SUMMARY OF THE INVENTION

This invention relates generally to temperature sensors and controllers and more specifically to an electronic temperature sensor and controller that is adapted to replace conventional mechanical wall thermostats widely employed in connection with residential and commercial heating and cooling systems.

Temperature sensing and control functions have been traditionally accomplished using mechanical thermostats. These devices are inherently not very accurate, are basically unuseable in hostile weather environments, are not capable of performing multiple remote temperature sensing, and do not interface easily to the wide variety of sophisticated electronic computers on the market today.

While attempts have been made over the past several years to sense and control temperature electronically, those attempts have been somewhat limited in application due to high cost resulting from the use of relatively complex circuitry, the time consuming and difficult procedures involved in calibrating to a reasonably high degree of accuracy, and the inability to perform long range remote temperature sensing without suffering a degradation in accuracy.

Accordingly, the principal objects of the present invention are to provide an electronic temperature sensor/controller system that is more economical and reliable due to its efficient, simplified circuitry, that achieves higher accuracy while eliminating the need for multiple point calibration of each sensor, and that is capable of performing long range remote temperature sensing while maintaining that high degree of accuracy.

These objects are accomplished in accordance with the illustrated preferred embodiment of the invention by employing one or more sensing devices, a precision voltage reference, a pair of analog multiplexers, a voltage-to-frequency converter, a microcomputer, a keyboard, an output display, and one or more solid state switches.

DETAILED DESCRIPTION OF THE PREFERRED EMBODIMENT

Figure 1:
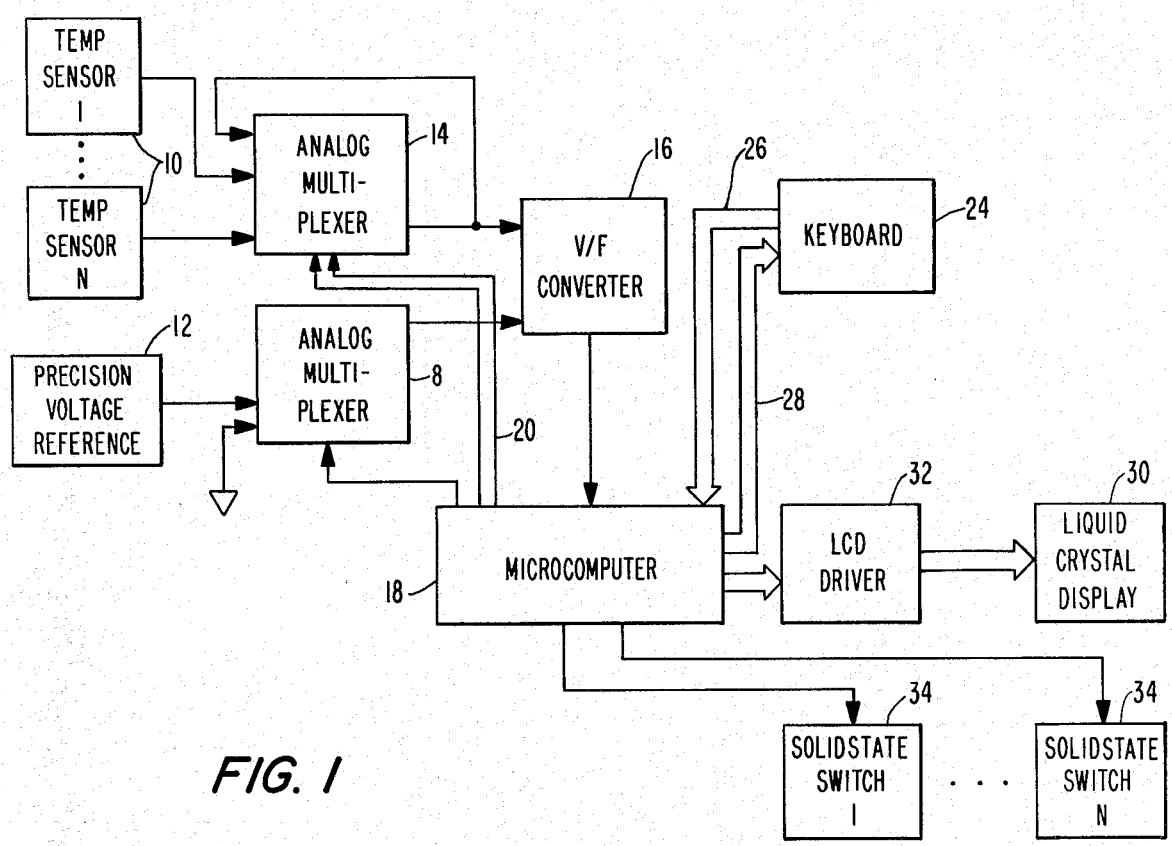
FIG. 1 is a block diagram of a temperature sensor/controller system constructed in accordance with the preferred embodiment of the present invention.

Referring now to FIG. 1, there is shown a plurality of temperature sensors 10 for sensing temperatures at an equal plurality of desired remote locations. A precision voltage reference 12 is employed to compensate for gain drift that may occur in the remainder of the circuitry. It is therefore desirable that precision voltage reference 12 have a low temperature coefficient and low voltage drift with time. The outputs from temperature sensors 10 are received by an analog multiplexer 14, and the output from precision voltage reference 12 is received by a second analog multiplexer 8. The output of analog multiplexer 14 is applied to a voltage-to-frequency converter 16, which must be sufficiently linear and have a sufficiently low offset specification to achieve a desired temperature measurement accuracy. The output of precision voltage reference 12 or a ground reference, as selected by analog multiplexer 8, is also applied to voltage-to-frequency converter 16. A microcomputer 18 is connected to receive the output of voltage-to-frequency converter 16 and to select one of the temperature sensors 10 via a plurality of select lines 20 coupling microcomputer 18 to analog multiplexer 14. A keyboard 24 is coupled to microcomputer 18 via four input lines 26 and four output lines 28. A display that may comprise, for example, a liquid crystal display (LCD) 30 and an LCD driver 32 is employed for displaying output information received from microcomputer 18. A number of solid state switches 34 are controlled by microcomputer 18.

Figure 2A:
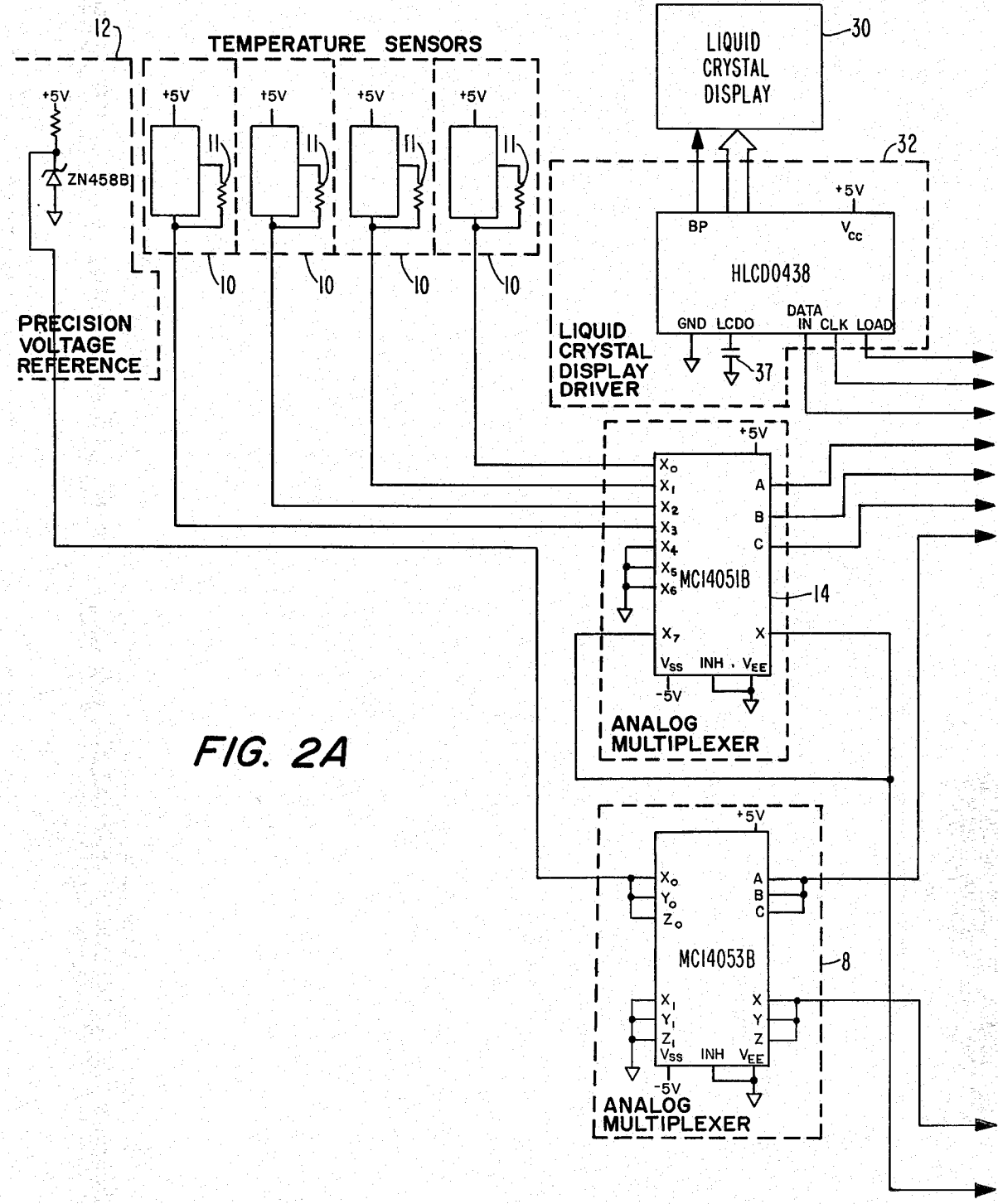
FIGS. 2A–B are a detailed schematic diagram of the circuitry illustrated in the block diagram of FIG. 1.
Figure 2B:
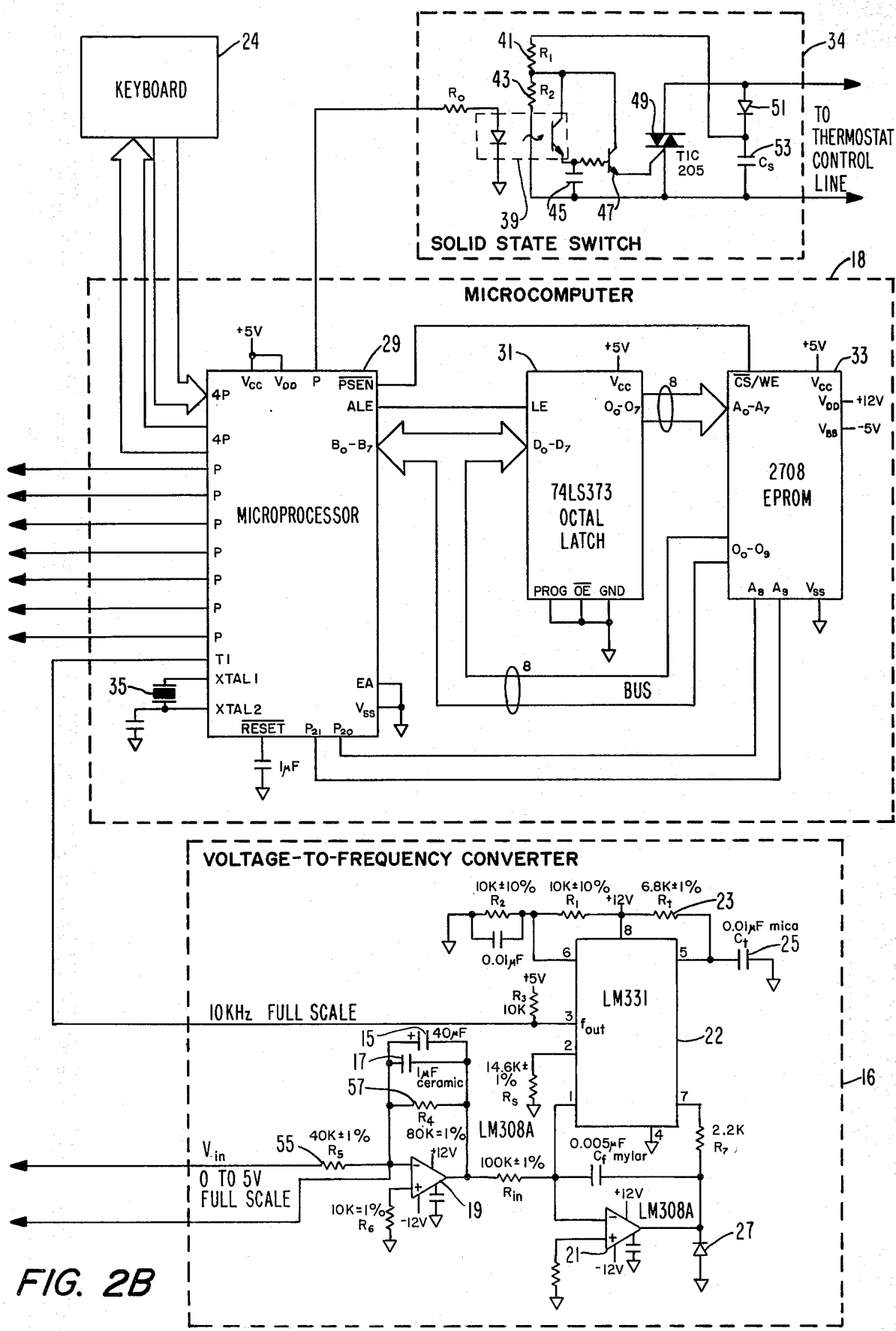

Referring now to the detailed schematic diagram of FIGS. 2A–B, it may be seen that the present temperature sensor/controller may be fabricated using standard off-the-shelf components. Temperature sensors 10 may each comprise, for example, a National Semiconductor LM334 three-terminal adjustable current source temperature transducer. Associated with each of temperature sensors 10 is a current set resistor 11, which may comprise a low temperature coefficient resistor such as a Mepco/Elcetra MF62C. Alternatively, temperature sensors 10 may each comprise an Analog Devices AD590 two-terminal integrated circuit (IC) temperature transducer, a current source type temperature transducer which does not require an external current set resistor. The three-terminal adjustable current source temperature transducer is preferred for most applications because it can be pre-calibrated by selecting the appropriate value of current set resistor 11 to set the desired temperature-to-current conversion gain. However, the AD590 temperature transducer is preferred in applications requiring very high accuracy. Current source type transducers, in general, have been selected because of their superior noise immunity characteristics and tolerance to various line lengths as compared to voltage source type temperature transducers.

Analog multiplexer 14 may comprise a Motorola MC14051B eight-channel analog multiplexer/demultiplexer. The output of the analog multiplexer 14, which is selected by microcomputer 18 from among the outputs of temperature sensors 10, or, alternatively, from the inverting input of an operational amplifier 19 within voltage-to-frequency converter 16, is applied to the inverting input of the operational amplifier 19. The former connection provides a current-to-voltage conversion so that the output of the operational amplifier 19 is a voltage proportional to the current of the selected one of temperature sensors 10, while the latter connection provides no current into the inverting input of the operational amplifier 19. By connecting the temperature sensors 10 to the inverting input of operational amplifier 19 rather than to an input resistor 55 of operational amplifier 19, the voltage across the selected temperature sensor 10 does not vary, thus improving the linearity of temperature sensor 10 significantly. A second analog multiplexer 8 may comprise a Motorola MC14053B triple two-channel analog multiplexer/demultiplexer. The precision voltage reference 12 is connected to three of the inputs of the analog multiplexer 8 in parallel to reduce the on resistance of the analog multiplexer 8. The other three inputs of the analog multiplexer 8 are connected to ground. The output of the analog multiplexer 8, which is selected by microcomputer 18 from either the precision voltage reference 12 or ground, is applied to the input resistor 55 of operational amplifier 19. The previously recited parallel connection of precision voltage reference 12 to three of the inputs of analog multiplexer 8 has the important effect of reducing the temperature drift of the reference voltage applied to the input resistor 55 of operational amplifier 19. To further reduce the temperature drift of the reference voltage across the input resistor 55, that resistor is selected to have a low temperature coefficient similar to that of current set resistors 11. A pair of capacitors 15 and 17, connected in parallel with a feedback resistor 57 of operational amplifier 19, are employed to suppress low and high noise pickup over long lines that may be associated with temperature sensors 10.

A voltage-to-frequency converter integrated circuit 22 may comprise, for example, a National Semiconductor LM331 precision voltage-to-frequency converter chip. A timing resistor 23 and a timing capacitor 25 are employed to scale the voltage-to-frequency conversion. A second operational amplifier 21 operates as an integrator in combination with voltage-to-frequency integrated circuit 22. Both operational amplifiers 19 and 21 preferably comprise National Semiconductor LM308A operational amplifiers, selected for their low offset voltage characteristics. A clamping diode 27 serves to clamp the output of operational amplifier 21 to ground to prevent the occurrence of damage to precision voltage-to-frequency converter chip 22. The output of precision voltage-to-frequency converter chip 22 is applied to an input of microcomputer 18.

Microcomputer 18 includes a microprocessor 29 that may comprise, for example, an Intel 8035 microprocessor chip. Microcomputer 18 further includes an octal latch 31 and an 8K UV erasable programmable read-only memory (EPROM) 33 that may comprise a Texas Instruments 74LS373 octal latch and an Intel 2708 PROM, respectively. Exemplary of various other ways in which microcomputer 18 may be implemented is through the use of an Intel 8048, 8049, or Motorola 6805 microcomputer or a Motorola MC146805 microprocessor in combination with an Intel 2716 16K EPROM. The illustrated preferred embodiment of microcomputer 18 was chosen because of the availability of a sufficient number of input and output lines, together with an on-board timer. A crystal 35 is employed as a time base within microcomputer 18 in the event a real time clock is implemented. Alternatively, since the accuracy of the temperature measurement does not depend on the stability of the time base, the time base may comprise a simple L-C network.

Liquid crystal display driver 32 may comprise, for example, a Hughes HLCD0438 serial input LCD driver which was chosen because of the simplicity with which it interfaces to microcomputer 18. A capacitor 37 sets the frequency of liquid crystal display driver 32.

LCD display 30 is simply employed to display desired temperature data and other information that may be available as an output from microcomputer 18. Alternatively, an external computer system may be interfaced to receive data from microcomputer 18. LCD display 30 may comprise any of a number of such displays commercially available as off-the-shelf components. For example, LCD display 30 may be formatted similar to a digital watch display which provides four seven-segment digits with a colon and as many annunciators as required in connection with the desired data programming and display.

Keyboard 24, which may comprise any of a number of commercially available 4×4 matrix-type keyboards, is employed to enter data into microcomputer 18. Alternatively, as in the case of LCD display 30, an external computer system may be interfaced to enter data into microcomputer 18. Exemplary of data that may be entered by the keyboard 24 are temperature and time set points, control information relating to the solid state switches 34, time setting information, an instruction to display time, etc.

Solid state switches 34 are controlled by an output line from microcomputer 18 and are employed to perform a switching function based upon the output of an associated one of the temperature sensors 10. While the solid state switches 34 may be constructed in any one of a number of ways based upon design choice, the preferred circuitry of the switch illustrated in FIG. 2B is designed to perform the switching function conventionally performed by mechanical thermostats which typically switch a low A.C. voltage. Solid state switches 34 each comprise an opto-coupler 39, a pair of resistors 41 and 43 that form a divider stick, a capacitor 45, a transistor 47, a thyristor 49, a rectifier 51, and a second capacitor 53. Opto-coupler 39 may comprise, for example, a Fairchild FCD 810 optically-coupled isolator, and transistor 47 may comprise a Motorola 2N2222 NPN transistor. Thyristor 49 may comprise a Texas Instruments TIC 205 thyristor, and rectifier 51 may comprise a Fairchild 1N914. In order to turn on solid state switches 34, it is necessary that microcomputer 18 issue periodic pulses to opto-coupler 39. These pulses maintain a sufficient charge on capacitor 45 to hold transistor 47 on, thereby maintaining thyristor 49 in the conducting state. Driving the opto-coupler 39 with pulses reduces its duty cycle, thus increasing its reliability and life. Rectifier 51 and capacitor 53 are employed to produce a D.C. supply voltage for powering opto-coupler 39 and transistor 47.

It has been found preferable to regulate only the +5 V. power supply for the circuitry of FIGS. 2A-B, while all other supply voltages may be unregulated.

In order to initially calibrate the temperature sensor/-controller system of FIGS. 1 and 2A-B, the microcomputer 18 is directed through keyboard 24 to select a particular one of temperature sensors 10 through analog multiplexer 14 and to select the ground input through analog multiplexer 8. A voltage associated with the selected one of temperature sensors 10 thus appears on the output of operational amplifier 19, to be converted to a frequency by voltage-to-frequency converter 16. Microcomputer 18 then counts the number of transitions of the output of voltage-to-frequency converter 16 in a given time interval that is determined by crystal time base 35. The resulting frequency $f_{cn}$, is stored in EPROM 33 of microcomputer 18. A frequency for each one of temperature sensors 10 is measured, following the same procedure. Next, the microcomputer 18 selects the inverting input of operational amplifier 19 through analog multiplexer 14, and the precision voltage reference input through analog multiplexer 8. The frequency $f_{ro}$, associated with precision voltage reference 12, is measured and also stored in EPROM 33. Finally, a scaling constant, K, which represents the ambient absolute temperature in the vicinity of the temperature sensors 10 at the time of calibration, is also stored in EPROM 33. The temperature sensors 10 are preferably kept in a constant temperature bath during calibration. The entire calibration procedure described above may be automated using an external computer.

In performing the measurement of a temperature sensed by a specified one of temperature sensors 10, microcomputer 18 measures the frequency, $f_n$, associated with that temperature sensor using a procedure similar to that described in the preceding paragraph. Microcomputer 18 also measures a frequency, $f_{ri}$, associated with precision voltage reference 12, as just described. Microcomputer 18 then computes the absolute temperature, T, being sensed by the specified one of temperature sensors 10 by evaluating the following expression employing variables stored in EPROM 33:

$$T = K f_n f_{ro}/f_{cn} f_{ri}.$$

This expression corrects for gain drift with temperature in the electronic circuitry of FIGS. 2A-B so that the only errors due to component parameter drift with temperature are the temperature coefficient of voltage of the precision voltage reference 12 and the temperature coefficient of resistance of the analog multiplexer 8 and the input resistor 55 associated with operational amplifier 19.

A standard scaling constant, K, may be stored in EPROM 33 for use with accessory temperature probes which can be added to the temperature sensor/controller of FIGS. 1 and 2A-B as desired. Since the current set resistors 11 may be adjusted to give a standard temperature-to-current conversion gain, the probes may be pre-calibrated to match the standard scaling constant K. Thus, the additional probes need not be calibrated along with the temperature sensor/controller at the time of manufacture of the temperature sensor/controller.

A test on absolute accuracy of the present temperature sensor/controller system as compared to a Hewlett-Packard 2804A Quartz Thermometer was conducted for two types of temperature sensors calibrated at 25° C. From −40° C. to +70° C., the National Semiconductor LM 134Z temperature sensor exhibited a maximum temperature measurement accuracy error of ±0.3° C. Over the same temperature range, the Analog Devices AD590K temperature sensor exhibited a maximum temperature measurement accuracy error of ±0.2° C. The Analog Devices AD590M temperature sensor has a linearity specification which is half that of the AD590K and, thus, would be preferred in applications which require even greater temperature measurement accuracy.

A typical application for the present temperature sensor/controller is in replacing the conventional mechanical wall thermostats in a residence or commercial building to control a gas furnace. Remote temperature sensors may be placed at several locations in the residence, such as the living room and a bedroom. The keyboard and LCD display may be used to set the real time clock as well as to program multiple temperature setpoints in advance. For instance, the bedroom sensor could be used to hold the bedroom temperature at 60° F. during the night time hours. In the morning the temperature sensor/controller could hold the temperature at approximately 55° F. with a $\Delta T = T_{off} - T_{on} = 10°$ F. The greater $\Delta T$ would provide more efficient utilization of energy during the time that the residence is unoccupied. The temperature sensor/controller could then bring the living room temperature up to 70° F. with a smaller $\Delta T$ before the occupants arrive in the evening. The energy savings using this approach to temperature sensing and controlling compared to the use of conventional wall thermostats is considerable, not to mention the increased comfort and convenience.

By replacing the keyboard 24 and LCD display 30 with an interface to an external computer system, the temperature sensor/controller could be used to remotely sense temperatures at many locations and to control heating and cooling systems in a large office building, for example. The computer could be arranged to re-program the temperature sensor/controller as necessary to accommodate the the different temperature control requirements for evenings, weekends, holidays, etc.

Another application for the present temperature sensor/controller is in connection with active solar energy systems. In such a system, the temperature sensor/controller could be used to measure the temperature in the solar collectors and to control the operation of water pumps as necessary.

The present temperature sensor/controller may also be used to accomplish remote temperature data collection for weather forecasting. In that environment, the temperature sensor/controller could be interfaced to a telephone to enable a central computer to dial the various sense locations and receive temperature data such as temperature versus time, minimum and maximum temperatures, and relative humidity.

A number of commands may be programmed into the temperature sensor/controller. For example, it may be programmed to take different actions during several time intervals over the course of a day by programming start times for each time interval. Exemplary of a string of commands that may be associated with each such time interval and which would apply to a selected one of the solid state switches 34 is (start time), (sensor #), ($T_{on}$), ($T_{off}$), (solid state switch #). The commands $T_{on}$ and $T_{off}$ specify the temperatures at which the selected solid state switch would turn on and off, respectively. Several such strings of commands may be programmed for different time intervals to be associated with different ones of the solid state switches 34. Instead of simple $T_{on}$ and $T_{off}$ commands, the temperature sensor/controller could also be programmed to provide a duty cycle drive to one or more external devices such that the duty cycle would depend on how far the measured temperature is from a previously set temperature $T_{set}$. In the event the measured temperature is above $T_{set}$, one external device would be selected; if below, another would be selected. This arrangement would be useful for controlling the temperature of an environment very closely. A typical string of commands for use in such a situation may be (start time), (sensor #), ($T_{set}$), (+100% duty cycle deviation), (−100% duty cycle deviation), (+ solid state switch #), (− solid state switch #). The + and −100% duty cycle deviations would be the temperature deviation above and below the set temperature, respectively, at which the duty cycle of the solid state switch drive would be 100%. This duty cycle would decrease linearly to 0% as the measured temperature approaches $T_{set}$. The + and − solid state switch #'s are the solid state switches that would be selected if the measured temperature falls above or below the set temperature, respectively. Several such strings of commands could be programmed for each time interval established and, in turn, for each one of the temperature sensors 10.

I claim:

1. A temperature sensor/controller comprising:

temperature sensing means having a current output, said temperature sensing means being positioned at a point at which it is desired to measure temperature;

analog multiplexing means coupled to said temperature sensing means and to a voltage-to-frequency converter means for providing a voltage that is proportional to the current output of said temperature sensing means;

precision voltage reference means for providing as an output a substantially temperature insensitive source of reference voltage;

said voltage-to-frequency converter means being further coupled to said precision voltage reference means for alternately providing a first output signal whose frequency is proportional to the current output of said temperature sensing means and a second output signal whose frequency is proportional to the output of said precision voltage reference means; and processor means coupled to said voltage-to-frequency converter means for alternately applying the output of said analog multiplexing means and the output of said precision voltage reference means to said voltage-to-frequency converter means and for computing the temperature sensed by said temperature sensing means in accordance with a predetermined mathematical relationship involving parameters derived from the output of said temperature sensing means and the output of said precision voltage reference means.

2. A temperature sensor/controller as in claim 1 wherein said processor means is operative for computing the temperature T sensed by said temperature sensing means in accordance with the mathematical expression $T = K f_n f_{ro} / f_{cn} f_{ri}$, where K is a scaling constant equal to the ambient absolute temperature at a point proximate said temperature sensing means at a time of calibration, $f_n$ is the frequency of the first output signal of said voltage-to-frequency converter means at a time of temperature measurement, $f_{ro}$ is the frequency of the second output of said voltage-to-frequency converter means at the time of calibration, $f_{cn}$ is the frequency of the first output signal of said voltage-to-frequency converter means at the time of calibration, and $f_{ri}$ is the frequency of the second output signal of said voltage-to-frequency converter means at the time of temperature measurement.

3. A temperature sensor/controller as in claim 1 wherein:

said temperature sensing means comprises a plurality of temperature transducers having a linear current output, each of said plurality of temperature transducers being positioned at a different point at which it is desired to measure temperature;

said processor means is operative for applying the output of a selected one of said plurality of temperature transducers to said voltage-to-frequency converter means through said analog multiplexing means to compute the temperature sensed by that selected temperature transducer.

4. A temperature sensor/controller as in claim 3 further comprising display means coupled to said processor means for visually displaying the temperature computed by said processor means as having been sensed by the selected temperature transducer.

5. A temperature sensor/controller as in claim 4 further comprising keyboard input means coupled to said processor means for enabling the user to enter information into said processor means for controlling the operation of the temperature sensor/controller.

6. A temperature sensor/controller as in claim 5 further comprising one or more solid state switches coupled to said processor means for controlling a corresponding one or more external devices in response to said processor means.

7. A temperature sensor/controller as in claim 6 wherein said processor means includes real time clock means for controlling said processor means.

* * * * *